US009338277B2

(12) United States Patent
Kadavallur et al.

(10) Patent No.: US 9,338,277 B2
(45) Date of Patent: May 10, 2016

(54) METHOD AND SYSTEM FOR RESPONDING TO AN EMERGENCY SITUATION FROM A MOBILE COMMUNICATION DEVICE

(75) Inventors: Jyothi C. Kadavallur, Bangalore, IN (US); Craig G. Bishop, Boca Raton, FL (US); Kevin M. Eldred, Syracuse, NY (US); Nona E. Gage, Sea Ranch Lakes, FL (US); Timothy Heffield, Sunrise, FL (US); Jose E. Korneluk, Lake Worth, FL (US)

(73) Assignee: Google Technology Holdings LLC, Mountain View, CA (US)

( * ) Notice: Subject to any disclaimer, the term of this patent is extended or adjusted under 35 U.S.C. 154(b) by 1735 days.

(21) Appl. No.: 11/686,522

(22) Filed: Mar. 15, 2007

(65) Prior Publication Data

US 2008/0227427 A1 Sep. 18, 2008

(51) Int. Cl.
*H04M 11/04* (2006.01)
*H04M 1/00* (2006.01)
*H04M 1/725* (2006.01)
*H04W 4/22* (2009.01)

(52) U.S. Cl.
CPC ............ *H04M 1/72536* (2013.01); *H04W 4/22* (2013.01); *H04M 2250/10* (2013.01)

(58) Field of Classification Search
CPC ...................................................... H04W 4/22
USPC ............. 455/403, 404.1, 414.1–414.4, 552.1, 455/553.1, 557, 518, 519, 521, 456.1, 457, 455/9, 550.1, 556.1, 556.2; 340/287–309; 379/37–51; 370/310.2, 328, 338
See application file for complete search history.

(56) References Cited

U.S. PATENT DOCUMENTS

| | | | |
|---|---|---|---|
| 5,742,904 A | 4/1998 | Pinder et al. | |
| 6,314,281 B1 | 11/2001 | Chao et al. | |
| 6,907,238 B2 * | 6/2005 | Leung | 455/404.1 |
| 7,098,787 B2 * | 8/2006 | Miller | 340/539.18 |
| 2002/0077075 A1 * | 6/2002 | Ikonen et al. | 455/404 |
| 2002/0181492 A1 * | 12/2002 | Kasami et al. | 370/445 |
| 2004/0192336 A1 * | 9/2004 | Walby | 455/456.1 |
| 2005/0143049 A1 | 6/2005 | Hoke, Jr. | |
| 2006/0193447 A1 * | 8/2006 | Schwartz | 379/45 |
| 2006/0234727 A1 * | 10/2006 | Ashley et al. | 455/456.4 |

* cited by examiner

*Primary Examiner* — San Htun
(74) *Attorney, Agent, or Firm* — Faegre Baker Daniels LLP

(57) ABSTRACT

A method and system for responding to an emergency situation from a mobile communication device (100) is provided. The method includes initiating (306) a call to an emergency services number using a first modem (202) of the mobile communication device. The first modem communicates with a communication system via a first air interface. Further, the method includes detecting (308) the initiating of the call to the emergency services number. Furthermore, the method includes initiating (310) automatically an emergency transmission using a second modem (204) of the mobile communication device in response to detecting the call to the emergency services number. The second modem uses a second air interface for emergency transmission. The emergency transmission is performed concurrently with initiating the call to the emergency services number.

19 Claims, 8 Drawing Sheets

100

METHOD AND SYSTEM FOR RESPONDING TO AN EMERGENCY SITUATION FROM A MOBILE COMMUNICATION DEVICE

FIELD OF THE INVENTION

The present invention relates in general to the field of mobile communication devices, and more specifically, to a method and system for responding to an emergency situation from a mobile communication device.

BACKGROUND OF THE INVENTION

Mobile communication devices are important tools for communication as well as transmitting and receiving data and information. Such devices are commonly used to transmit and receive voice and speech data over a distance. Examples of a mobile communication device can include a mobile phone, a smart phone, a pager, and a Personal Digital Assistant (PDA). These devices have practically become a necessity in today's world. This statement becomes even more apt when a user of the mobile communication device finds himself or herself in an emergency situation. The emergency situation can be an accident, a fire, a tornado, a hurricane or a terrorist attack. In such a case, the user generally dials E911 for sending an emergency message to get an immediate help. The emergency message can be conveyed by a call, a text message or a voice message, preferably along with a Global Positioning System (GPS) location information of the user in distress. Typically, the rescue agencies send an acknowledgement when the emergency message is received by them. The acknowledgement can be in a form of a message, a signal or a call. The rescue agencies then rush to the user to provide appropriate help.

Conventional mobile communication devices allow the user to transmit the emergency message to the rescue agencies using an air interface. The air interface may be, for example, a Code Division Multiple Access (CDMA) interface, a Push-to-Talk (PTT) interface, a Global System for Mobile communication (GSM) interface or a direct communication interface. However, these conventional mobile communication devices do not allow simultaneous transmission on more than one air interface. This becomes necessary when a user is not able to transmit the emergency message using a particular air interface or when the user wishes to send a concomitant emergency alert to a third-party. In either of these cases, the user should have an option of using other air interfaces for transmitting the emergency message/s.

Further, the transmission of the emergency message is not possible when neither or none of these air interfaces is present, for example, when the mobile communication device is out of a network coverage area. As a result, the user in this situation is rendered helpless.

In light of the above, there is a need for an effective method and system for responding to an emergency situation from a mobile communication device. The system should be capable of transmitting an emergency message even when it is out of network coverage. Also, it should have the capability to transmit the emergency message over a plurality of air interfaces simultaneously and/or sequentially.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Figure 1:
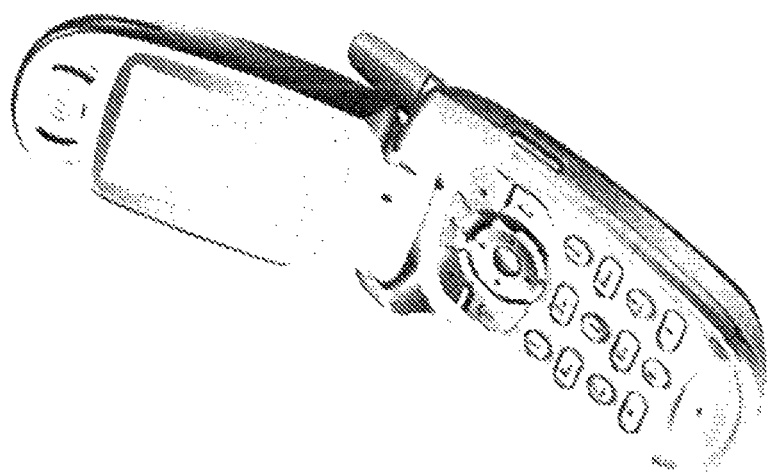
FIG. 1 illustrates an exemplary mobile communication device, in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

For one embodiment, a method for responding to an emergency situation from a mobile communication device is provided. The method includes initiating a call to an emergency services number using a first modem of the mobile communication device. The first modem communicates with a communication system via a first air interface. Further, the method includes detecting the initiating of the call to the emergency services number, and subsequently initiating, automatically, an emergency transmission using a second modem of the mobile communication device in response to detecting the call to the emergency services number. The second modem uses a second air interface for the emergency transmission that is different than the first air interface. The initiating of the emergency transmission using the second modem is performed concurrently with initiating the call to the emergency services number on the first modem.

For another embodiment, a mobile communication device for responding to an emergency situation is provided. The mobile communication device includes a first modem and a second modem. The first modem is configured to initiate a call to an emergency services number using a first air interface. Further, the second modem is configured to automatically initiate an emergency transmission using a second air interface in response to detecting the call to the emergency services number. Initiating the emergency transmission is performed concurrently with initiating the call to the emergency services number on the first modem.

Before describing in detail the particular method and system for responding to an emergency situation from a mobile communication device, in accordance with various embodiments of the present invention, it should be observed that the present invention resides primarily in combinations of method steps related to a method for responding to an emergency situation from a mobile communication device, and also in a mobile communication device appropriately configured which performs the method. Accordingly, the system components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms 'comprises,' 'comprising,' or any other variation thereof, are intended to cover a non-exclusive inclusion, such that a process, method, article or apparatus that comprises a list of elements does not include only those elements but may include other elements that are not expressly listed or inherent in such a process, method, article or apparatus. An element proceeded by 'comprises . . . a' does not, without more constraints, preclude the existence of additional identical elements in the process, method, article or apparatus that comprises the element. The term "another," as used in this document, is defined as at least a second or more. The terms "includes" and/or "having", as used herein, are defined as comprising. The term "another," as used in this document, is defined as at least a second or more.

FIG. 1 illustrates an exemplary mobile communication device 100, in accordance with an embodiment of the present invention. Examples of the mobile communication device can include, but are not limited to, a mobile phone, a smart phone, a pager, and a Personal Digital Assistant (PDA). For one embodiment, the mobile communication device can make simultaneous E911 calls in case of an emergency situation. The emergency situation can be, for example, an accident, a fire, a tornado, a hurricane, a terrorist attack or any condition where the user of the mobile communication device 100 needs help. An E911 call is made to inform a rescue agency about the emergency situation of the user. Further, an emergency call can also convey a Global Positioning System (GPS) location information of the mobile communication device 100 to the rescue agency. On receiving the emergency call from a distressed user, the rescue agency can send an acknowledgement signal or a message to the mobile communication device 100. The acknowledgement message acts as an indicator to the user of the mobile communication device 100 that the rescue agency has received the emergency call. The agency can then send the appropriate help to the user in distress.

Figure 2:
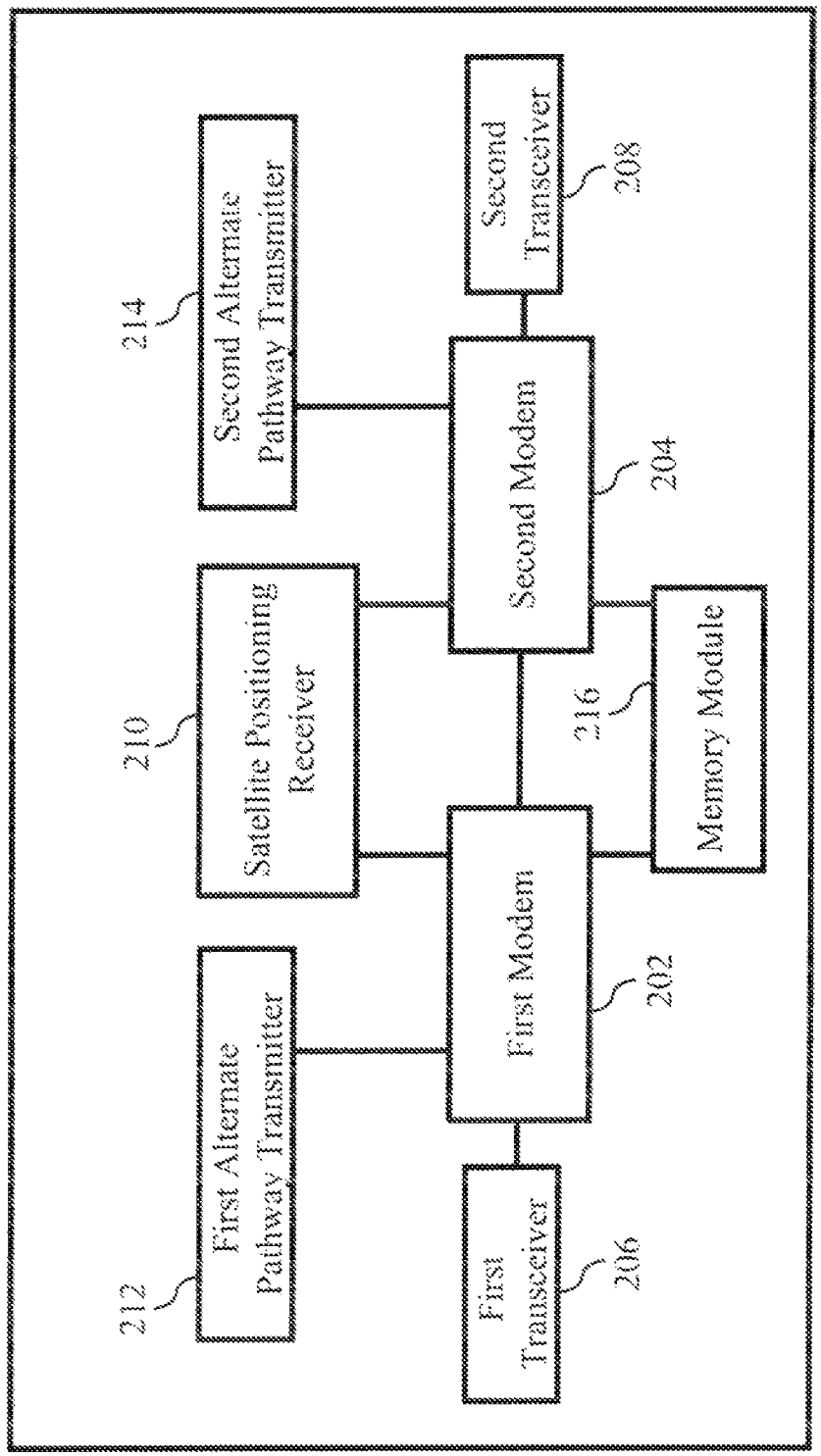
FIG. 2 illustrates a block diagram of an exemplary mobile communication device, in accordance with an embodiment of the present invention.

FIG. 2 illustrates a block diagram of the exemplary mobile communication device 100, in accordance with an embodiment of the present invention. For one embodiment, the mobile communication device 100 can include a first modem 202, a second modem 204, a first transceiver 206, a second transceiver 208, a satellite positioning receiver 210, a first alternate pathway transmitter 212, a second alternate pathway transmitter 214 and a memory module 216. Further, the above stated components have been included in the mobile communication device 100 for the sake of describing various embodiments of the present invention. However, it will be apparent to a person ordinarily skilled in art that the mobile communication device 100 can include more or less components than stated above. As an example, the first modem 202 can be an application processor and the second modem 204 can be a baseband processor.

The first modem 202 can be configured to initiate a call to an emergency services number using a first air interface. The call is initiated when a user of the mobile communication device 100 dials an emergency services agency number, such as 911, on the mobile communication device 100. The call can include, for example, a normal voice message or it can be a text message, an icon and/or a message with a Global Positioning System (GPS) location information of the mobile communication device 100. The first air interface can be, for example, a Code Division Multiple Access (CDMA) air interface, a Push-to-Talk (PTT) air interface, a Global System for Mobile communication (GSM) air interface, or a direct communication air interface. The first modem 202 can also be configured to determine the appropriate air interface to use based on a predefined criterion. The predefined criterion can be determined by the user or it can be based on the availability of the air interface present in the area of the mobile communication device 100. For example, the air interface having the strongest signal in the present vicinity can be selected for initiating the call.

In a similar way, the second modem 204 can be configured to automatically initiate an emergency transmission using a second air interface in response to detecting the call to the emergency services number over the first modem. It can be ensured that both the first modem 202 and the second modem 204 do not use the same air interface for transmission of the call. The emergency transmission using the second modem 204 is performed substantially concurrent with the initiation of the call using the first air interface. When the user of the mobile communication device 100 dials E911 on the mobile communication device 100, the emergency transmission can be automatically initiated. For one embodiment, the second modem 204 can determine the appropriate air interface to initiate the emergency transmission. For the purpose of description, the term 'second air interface' has been used for the appropriate air interface. The second modem 204 can determine the second air interface based on the predefined criterion.

It will be apparent to a person ordinarily skilled in the art that the mobile communication device 100 can include more modems besides the first modem 202 and the second modem 204. For example, for one embodiment, the mobile communication device 100 can include a third and a fourth modem to facilitate multi-modal capability. In this embodiment, the additional two modems can initiate the call using a third and a fourth air interface. The calls can be initiated simultaneously with the initiation of the call using the first modem 202 and the second modem 204. Also, for one embodiment, the first modem 202 and the second modem 204 can have multi-modal capability and can simultaneously initiate the call over the first and the second air interfaces.

Further, the first modem 202 is also connected to a first transceiver 206. The first transceiver 206 transmits the call over the first air interface, which is determined by the first modem 202. In the same way, the second modem 204 is connected to a second transceiver 208. The second transceiver 208 transmits the emergency transmission over the second air interface, which is determined by the second modem 204. For one embodiment, the first transceiver 206 and the second transceiver 208 can initiate transmission of the call and the emergency transmission simultaneously. Further, the first transceiver 206 can also be configured to receive an acknowledgement message for the call. The acknowledgment message can be sent by the rescue agencies when they receive the call. The acknowledgment message acts as an indicator to the user of the mobile communication device 100 that the request for help has been received by the rescue agencies.

Similarly, the second transceiver 208 is also configured to receive an acknowledgment message in response to the emergency transmission.

Further, the first modem 202 is connected to a first alternate pathway transmitter 212. The first alternate pathway transmitter 212 can initiate the call via an alternate air interface. The alternate air interface can be any other air interface, which has not been previously determined by the first modem 202 for initiating the call. For example, in one case, integrated Digital Enhanced Network (iDEN) can be the determined air interface and MOTOtalk can be the alternate air interface. Similarly, the second modem 204 is connected to a second alternate pathway transmitter 214. The second alternate pathway transmitter 214 can initiate the emergency transmission over an alternate air interface. Here also, the alternate air interface is different from the air interface used by the second modem 204 for initiating the call. For example, Code Division Multiple Access (CDMA) can be the determined air interface and Global System for Mobile communication (GSM) can be the alternate air interface. For one embodiment, the first transceiver 206, the second transceiver 208, the first alternate pathway transmitter 212 and the second alternate pathway transmitter 214 can initiate the call and the emergency transmission simultaneously. This allows the mobile communication device 100 to call and transmit over a plurality of air interfaces simultaneously.

For one embodiment, the first modem 202 and the second modem 204 can be connected to the satellite positioning receiver 210. The satellite positioning receiver 210 can be, for example, a Global Positioning Service (GPS) subsystem. The satellite positioning receiver 210 can determine the satellite location of the mobile communication device 100. This satellite location can be sent along with the call or the emergency transmission to the rescue agency. Further, the first modem 202 and the second modem 204 can also be connected to the memory module 216. The memory module 216 can store a preconfigured emergency message that the user of the mobile communication device 100 intends to send at the time of emergency. For example, instead of typing the message at the time of the emergency, the user can save the message beforehand and can retrieve it in the time of need. The emergency message can be, for example, a voice message, a text message, a picture message or an icon.

Figure 3:
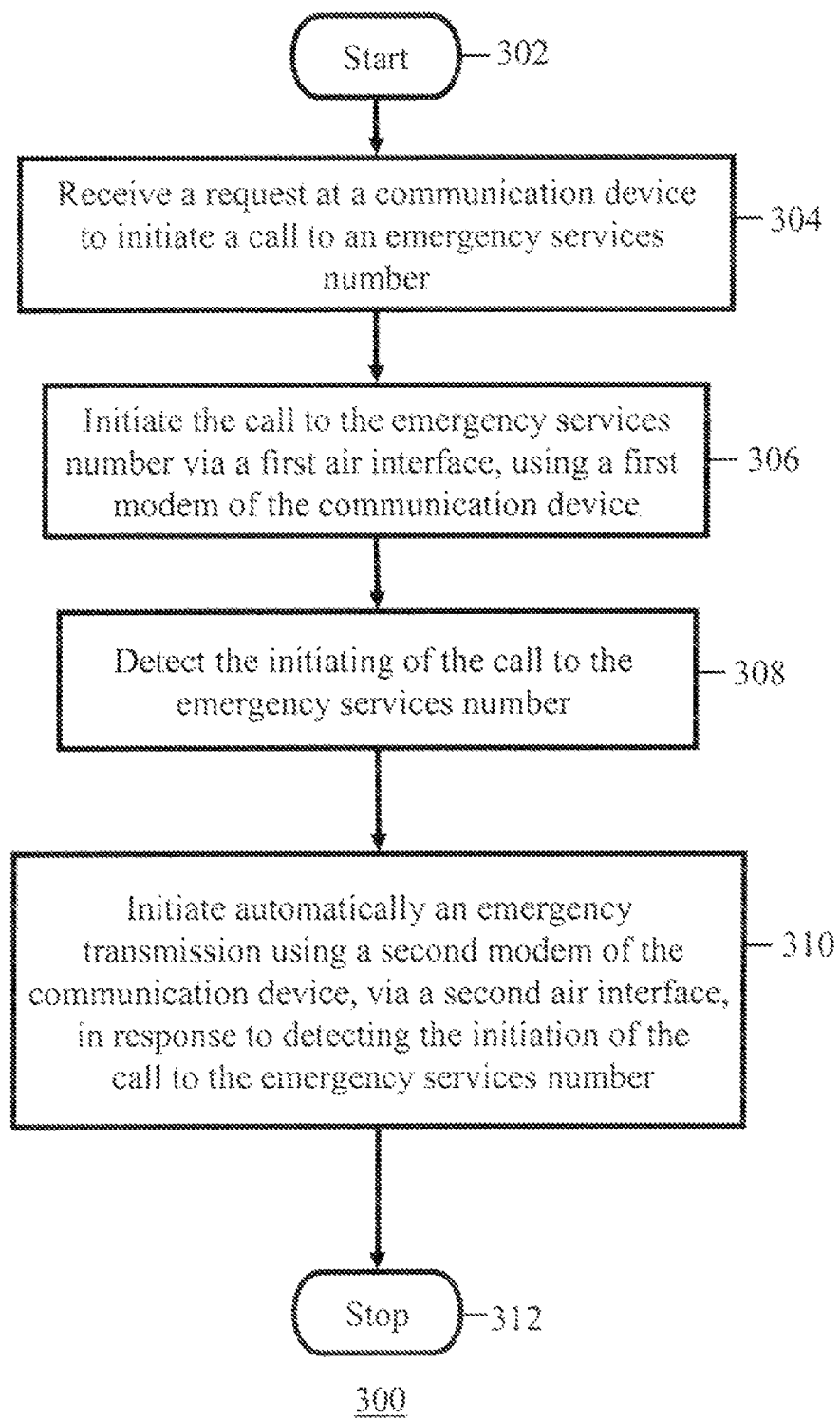
FIG. 3 illustrates a flow diagram for a method for responding to an emergency situation from a mobile communication device, in accordance with a first embodiment of the present invention.

FIG. 3 illustrates a flow diagram for a method 300 for responding to an emergency situation from the mobile communication device 100, in accordance with a first embodiment of the present invention. The above mentioned emergency situation can be, for example, an accident, a fire, a tornado, a hurricane or a terrorist attack. In such a situation, a user of the mobile communication device 100, generally, seeks help from rescue agencies and/or his friends. The present invention provides a method by which the user can respond to the emergency situation using the mobile communication device 100. To describe the method 300, reference will be made to FIGS. 1 and 2, although it is understood that the method 300 can be implemented in any other suitable environment or network. Moreover, the invention is not limited to the order in which the steps are listed in the method 300.

At step 302, the method 300 is initiated. At step 304, the mobile communication device 100 receives a request for initiating a call to an emergency services number. The request can be made by the user operating the mobile communication device 100 when he/she is in an emergency situation and needs help from the rescue agency. Further, a satellite location information of the mobile communication device 100 can also be sent along with the call. At step 306, the call is initiated to the emergency services number via a first air interface. The call can be initiated using the first modem 202 of the mobile communication device 100. The first modem 202 can be used for communicating with a communication system. The communication system can be, for example, an emergency services modem, a helpline, a mobile communication device at a rescue agency and the like. Further, the first air interface can be, for example, the Code Division Multiple Access (CDMA) air interface and the first modem 202 can be an application processor.

At step 308, the initiation of the call to the emergency services number can be detected. This can be done by, for example, identifying the partial sequence of the emergency services number being entered by the user of the mobile communication device 100. For example, when a user intends to call 'E911', the initiation of the call can be detected when 'E911' is pressed by the user at the mobile communication device 100. This constitutes 'partial sequence' of the dialed emergency services number. At step 310, an emergency transmission is automatically initiated, in response to the detection of the initiation of the call. The emergency transmission can be done using the second modem 204 of the mobile communication device 100. The transmission is performed via a second air interface. For one embodiment, initiating the emergency transmission can include, for example, broadcasting an emergency beacon via a direct communication mode. The emergency beacon can be, for example, a text message, a voice message, an icon and/or a text telephone (TTY) message. Also, along with the emergency beacon, a location data can also be transmitted. The location data can indicate the location of the mobile communication device 100. The location can be determined using the satellite positioning receiver 210 of the mobile communication device 100. Further, there may be a case when the mobile communication device 100 is out of a network coverage area and it does not include the satellite positioning receiver 210. The location data, in this case, can include a last-used base station position of a base station when the mobile communication device 100 was in a network coverage area. In other words, the emergency beacon can include the last known location data of the mobile communication device 100, when it was in the network coverage area, and this data can be sent to the rescue agencies. Further, the emergency beacon can also be transmitted over a plurality of modulations. For example, the beacon can be transmitted at different amplitude modulations. This can be done in conjunction with transmitting the beacon at a plurality of air interfaces simultaneously.

For one embodiment, transmission of call over the first air interface and the second air interface can be initiated sequentially. For example, if the call is transmitted over the first air interface and no acknowledgement is received within a predefined time interval, then the call can be initiated over the second air interface. For another embodiment, transmission of call over the first air interface and the second air interface can be initiated simultaneously. For example, the call can be transmitted to a rescue agency over the first air interface and to a relative of the user over the second air interface.

Furthermore, the emergency transmission can be disengaged by the mobile communication device 100 when an acknowledgement message is received from a rescue agency. The emergency transmission can also be disengaged when the user of the mobile communication device 100 manually aborts the transmission. At step 312, the method 300 is terminated.

Figure 4:
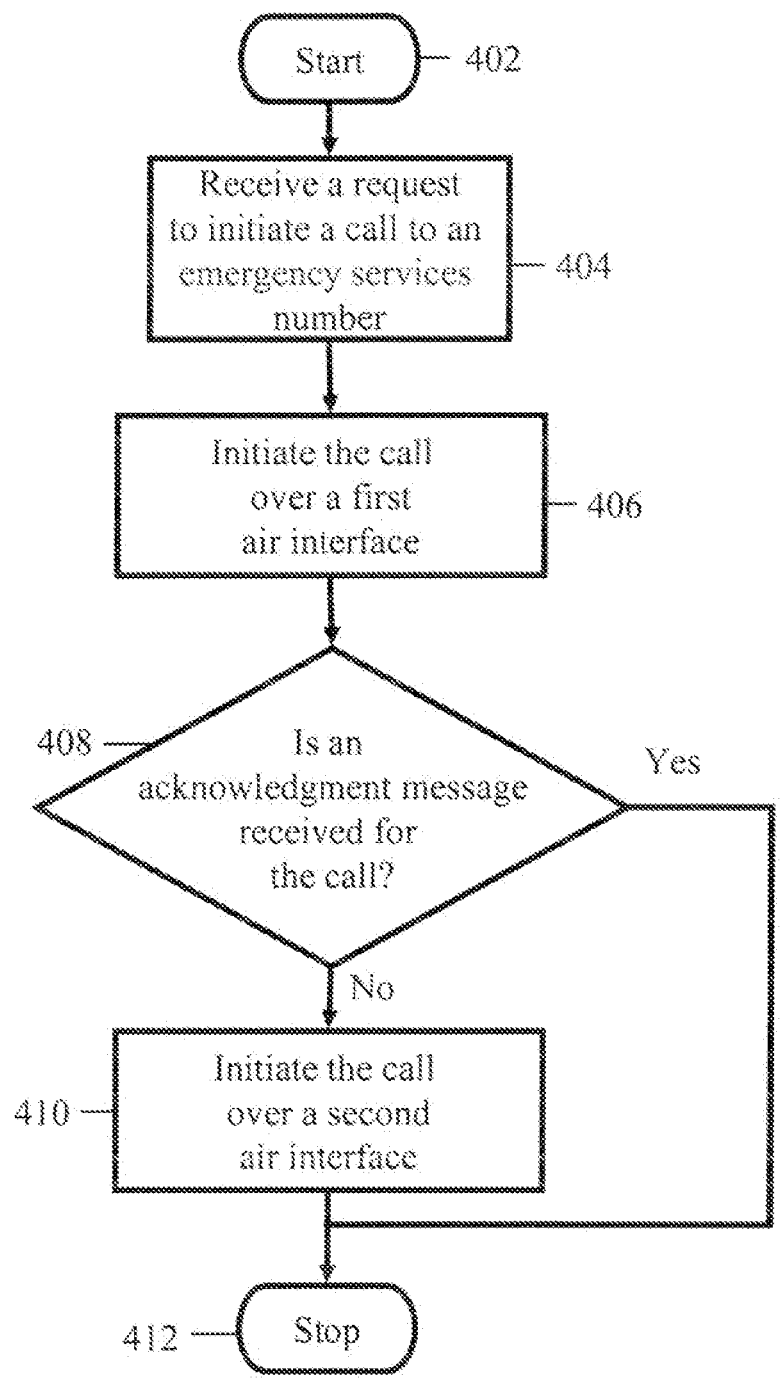
FIG. 4 illustrates a flow diagram for a method for responding to an emergency situation from a mobile communication device, in accordance with a second embodiment of the present invention.

FIG. 4 illustrates a flow diagram for a method 400 for responding to an emergency situation from the mobile communication device 100, in accordance with a second embodiment of the present invention. At step 402, the method 400 is initiated. At step 404, the mobile communication device 100 receives a request from a user operating the mobile communication device 100 to initiate a call to an emergency services number, like E911. The user can initiate the call when the user is in an emergency situation, like an accident, a fire, a tornado, a hurricane, a terrorist attack or any other condition where he needs help. At step 406, the call is initiated over a first air interface. The first air interface can be selected from a pair of air interfaces. This can be done by using the first modem 202. The functionalities of the first modem 202 have been explained in detail in conjunction with FIG. 2. For one embodiment, the pair of air interfaces can be, for example, a Code Division Multiple Access (CDMA) air interface and a Global System for Mobile communication (GSM) air interface.

At step 408, it is determined whether an acknowledgement message for a call is received. The acknowledgment message can be sent by the rescue agency to the mobile communication device 100 when it receives the call. At step 410, the call is initiated over the second air interface from the pair of air interfaces when the acknowledgment message is not received at the mobile communication device 100, for example, in a preselected period of time. The first call attempt may be sustained and continued as the second call is made over the second modem. Further, the call can be aborted when the acknowledgment message is received by the mobile communication device 100. The call can also be aborted, at any stage of the method 400, when the user of the mobile communication device 100 manually disengages the call. At step 412, the method 400 is terminated.

Figure 5:
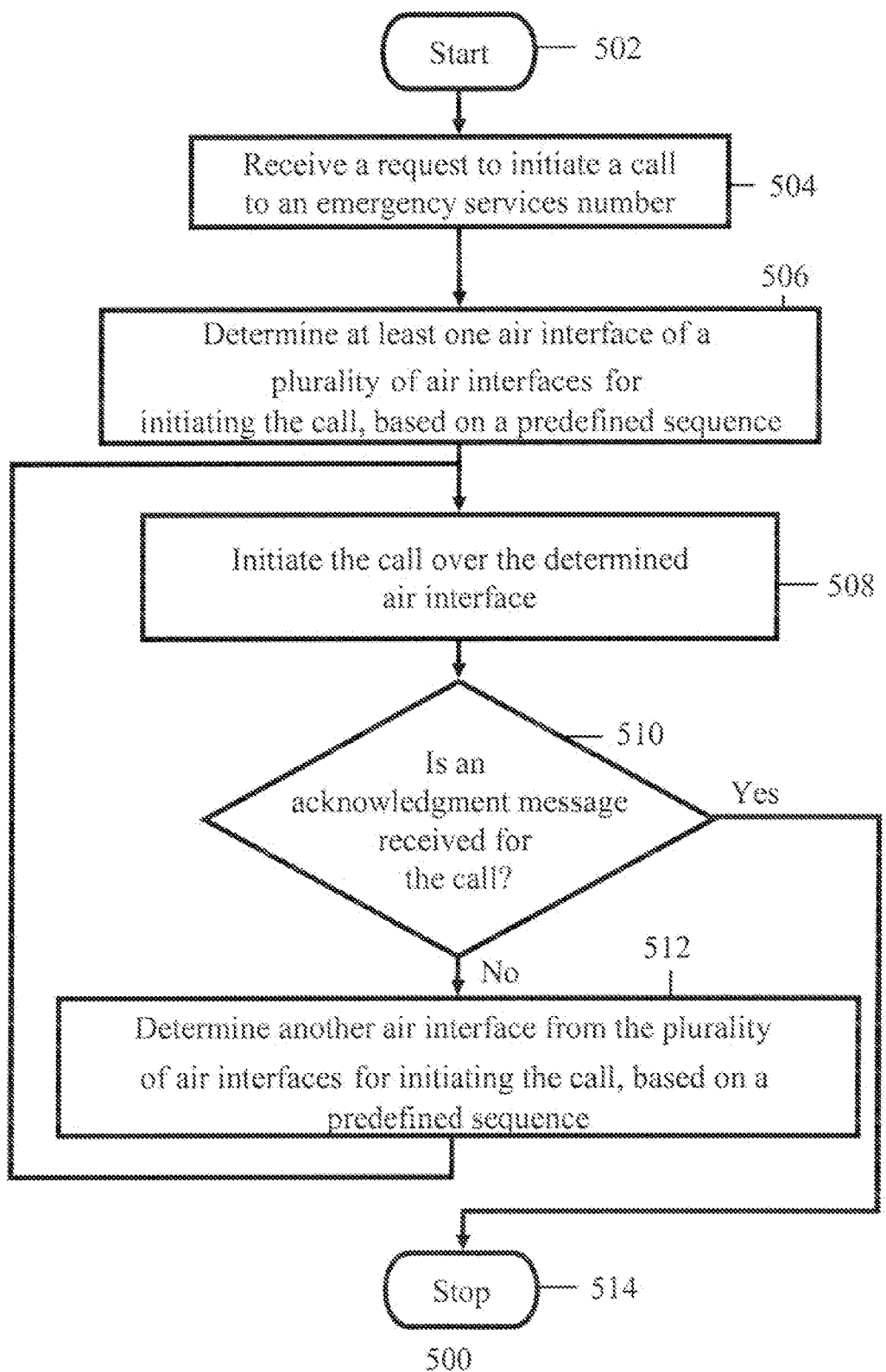
FIG. 5 illustrates a flow diagram for a method for responding to an emergency situation from a mobile communication device, in accordance with a third embodiment of the present invention.

FIG. 5 illustrates a flow diagram for a method 500 for responding to an emergency situation from the mobile communication device 100, in accordance with a third embodiment of the present invention. At step 502, the method 500 is initiated. At step 504, the mobile communication device 100 gets a request from a user operating the mobile communication device 100 to initiate a call to an emergency services number. The call can be made in an emergency situation, when the user needs help. At step 506, at least one air interface from a plurality of air interfaces is determined for initiating the call. The at least one air interface can be determined based on a predefined sequence. The predefined sequence can be, for example, a hierarchical sequence of the plurality of air interfaces or it can be defined by the user. At step 508, the call is initiated over the determined air interface.

At step 510, it is checked whether an acknowledgment message for the call is received. For one embodiment, the acknowledgment message can be sent by the rescue agency when they receive the call. At step 512, another air interface can be determined from the plurality of air interfaces to again initiate the call when the acknowledgment message is not received by the mobile communication device 100. The other air interface can determined based on the predefined sequence. For one embodiment, the predefined sequence of the plurality of air interfaces can be a Code Division Multiple Access (CDMA) air interface, a Global System for Mobile communication (GSM) air interface, a Push-to-Talk (PTT) air interface, or a direct communication air interface. The air interface, in this case, can be the CDMA air interface. The other transmission pathway can be the GSM pathway. At step 508, the call is initiated over the determined air interface. The steps 508, 510 and 512 are performed iteratively until an acknowledgement message is received for the call. The process goes on until the acknowledgment message is received by the mobile communication device 100. Also, the call can be aborted, at any stage of the method 500, when the user of the mobile communication device 100 manually disengages the call.

As an illustrative example, a user finds himself in an emergency situation, like an automobile accident. He can make a call to E911 to get help from a rescue agency. The hierarchical sequence of the air interfaces can be the same as that illustrated above. The E911 call will first be initiated over the Code Division Multiple Access (CDMA) air interface. If the call is received by the rescue agency and an acknowledgment is received by the mobile communication device, the second may be terminated. If the acknowledgement is not received, then the call is initiated over the Global System for Mobile communication (GSM) air interface while the first call is ongoing. This process goes on till an acknowledgment is received at the mobile communication device. Further, the user may abort the call manually at any point of time, if the user finds help from some other source. At step 514, the method 500 is terminated.

Figure 6:
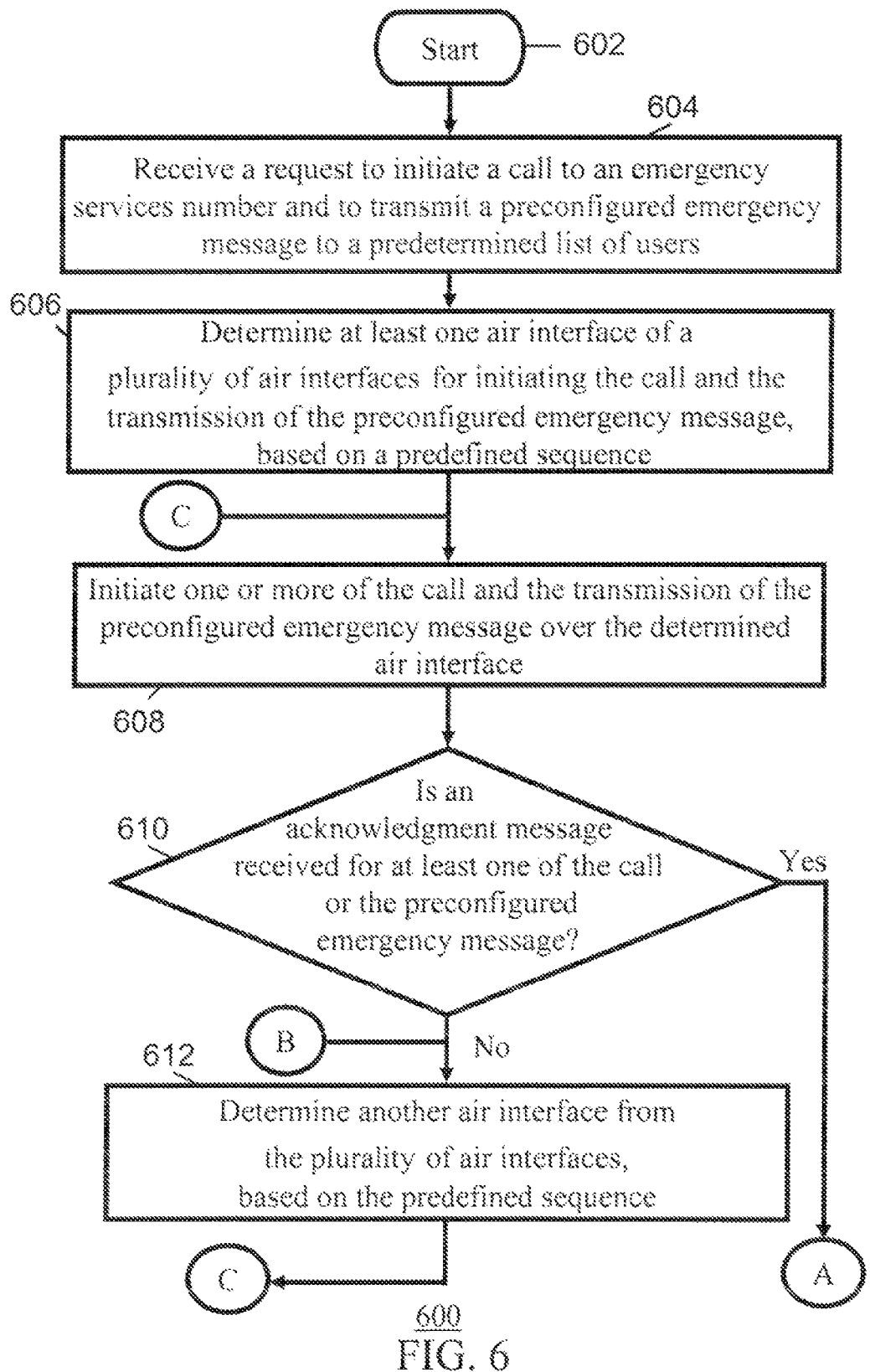
FIGS. 6 and 7 illustrate a flow diagram for a method for responding to an emergency situation from a mobile communication device, in accordance with a fourth embodiment of the present invention.
Figure 7:
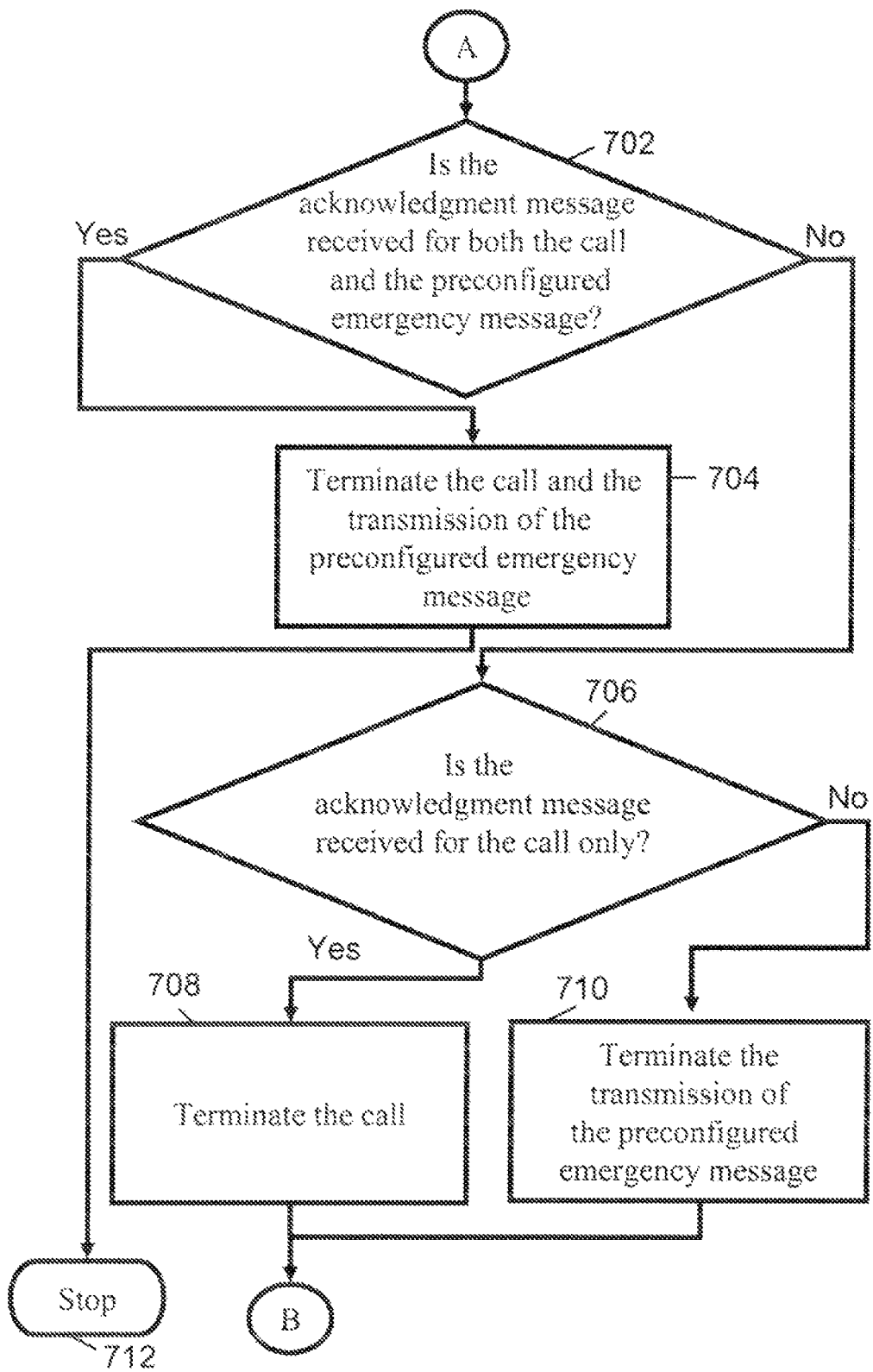

FIGS. 6 and 7 illustrate a flow diagram for a method 600 for responding to an emergency situation from the mobile communication device 100, in accordance with a fourth embodiment of the present invention. At step 602, the method 600 is initiated. At step 604, a request is received from a user of the mobile communication device 100 to initiate a call to an emergency services number and to transmit a preconfigured emergency message to a predetermined list of users. The preconfigured emergency message can be preset by the user of the mobile communication device 100. The predetermined list of users can include the contact numbers of friends, relatives, parents, spouse and/or children of the user of the mobile communication device 100.

At step 606, at least one air interface from a plurality of air interfaces is determined for the initiation of the call and the transmission of the preconfigured emergency message. The at least one air interface can be determined based on a predefined sequence. The predefined sequence can be a hierarchical sequence or it can be used defined. At step 608, one or more of the call and transmission of the preconfigured emergency message can be initiated over the determined air interface. At step 610, it is determined whether an acknowledgment message is received for at least one of the call or the preconfigured emergency message. The acknowledgment message for the call can be sent by a rescue agency after receiving the call. In a similar way, acknowledgment message for the preconfigured emergency message can be sent by one or more users from the predetermined list of users.

At step 612, another air interface from the plurality of air interfaces is determined, based on the predefined sequence when the acknowledgment message is not received for either the call or the preconfigured emergency message. In this case, the step 608 of initiating the call and transmitting the preconfigured emergency message over the determined air interface is again performed. Here, the determined air interface is the other air interface. This process continues iteratively until the acknowledgment message is received by the mobile communication device 100. As an illustrative example, a user may make a call to E911 to get help in an emergency. Further, the user can use his mobile communication device to transmit an emergency message to other users. His mobile communication device can select, for example, Code Division Multiple Access (CDMA) air interface to initiate the call and the transmission. This selection may be based on the user's personal choice or it may be based on a hierarchical sequence set by the user or it may be preset by the manufacturer of the mobile communication device. If the call is received by a rescue agency, they will send an acknowledgement message or a signal to the user. If the acknowledgement is not received by the mobile communication device, another air interface is selected, say, Global System for Mobile communication (GSM) air interface. Now this air interface is used for initiating the call and the transmission of the preconfigured emergency message. This process goes on until an acknowledgment is received by the mobile communication device.

At step 702, it is determined whether the acknowledgment message is received for both the call and the preconfigured emergency message. This is done when it is determined in the step 610 that the acknowledgment message is received for at least one of the call or the preconfigured emergency message. At step 704, the transmission of the call and the preconfigured emergency message is terminated when the acknowledgment message is received for both the call and the preconfigured emergency message. At step 706, it is determined whether the acknowledgment message is received for the call only. This is performed after it has been determined in the step 702 that the acknowledgment message is not received for both the call and the preconfigured emergency message. At step 708, the call is terminated when the acknowledgment message for the call is received. Further, the step 612 of determining another air interface from the plurality of air interfaces is again performed. The preconfigured emergency message is then transmitted over another air interface. This process goes on iteratively until the acknowledgment message for the preconfigured emergency message is received by the mobile communication device 100. Continuing with the illustrative example described earlier, if the user receives the acknowledgement message, his mobile communication device will check whether the acknowledgement is for the call or for the preconfigured emergency message. If the acknowledgement is for both the call and the message, transmission of both of them can be terminated. There may be a case, when the user receives the acknowledgement for the call only and not from anyone of his predetermined list of parents, brother and uncle, for example. The mobile communication device will then transmit the preconfigured emergency message over another air interface, say Global System for Mobile communication (GSM) air interface. If acknowledgement is not yet received from this air interface, another air interface, say Push-to-Talk (PTT) air interface, is selected for the transmission. This process can be continued till an acknowledgement is received from the selected parties, such as parents, the brother or the uncle, for example.

In a similar manner, at step 710, the transmission of the preconfigured emergency message is terminated when it is determined that the received acknowledgment message is not for the call. The step 612 of determining another air interface from the plurality of air interfaces is performed again. The call is then initiated over another transmission pathway. This process also goes on iteratively until the acknowledgment message for the call is received by the mobile communication device 100.

Along with the method steps described above, the call and the transmission of the preconfigured emergency message can also be terminated when the user of the mobile communication device 100 manually disengages the call and the transmission. Termination can be done for both the call and the preconfigured emergency message or it can be done individually for the call or the preconfigured emergency message. At step 712, the method 600 is terminated.

Figure 8:
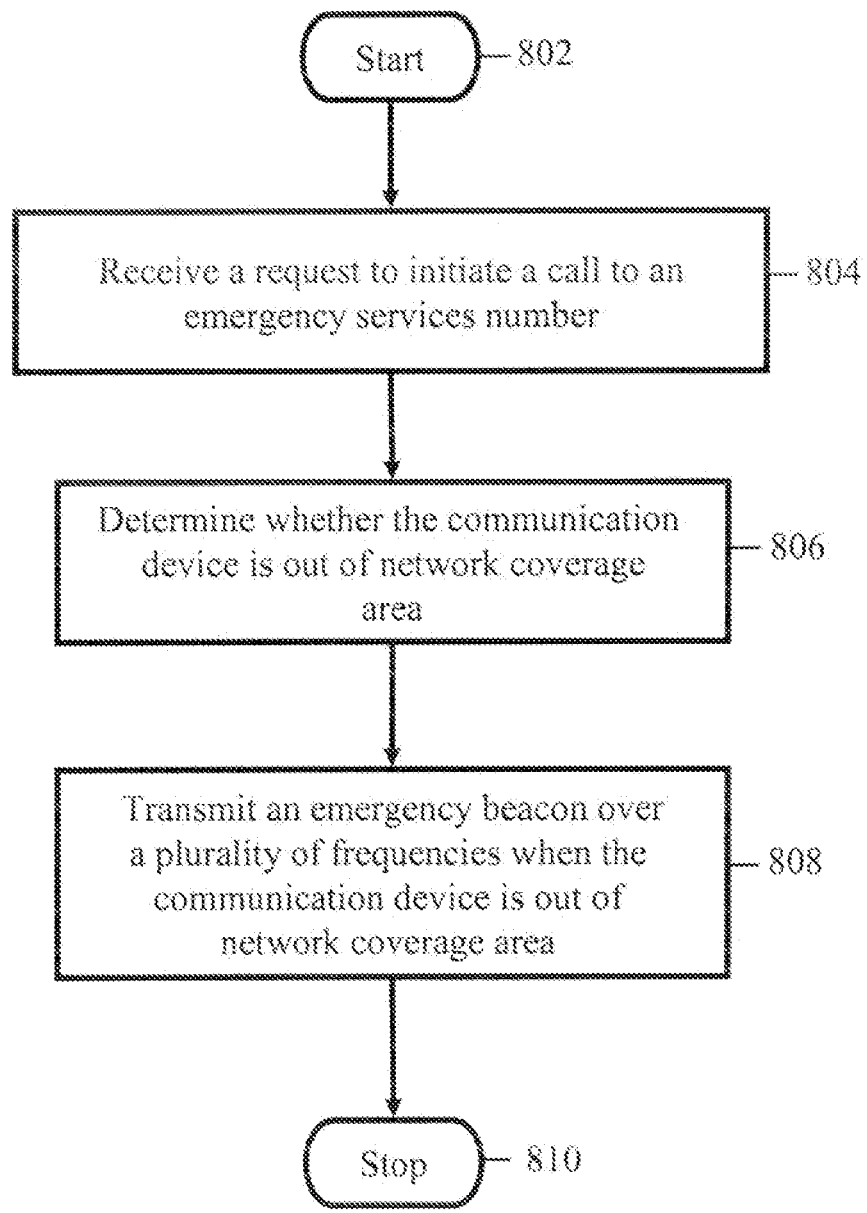
FIG. 8 illustrates a flow diagram for a method for responding to an emergency situation from a mobile communication device, in accordance with a fifth embodiment of the present invention.

FIG. 8 illustrates a flow diagram for a method 800 for responding to an emergency situation from the mobile communication device 100, in accordance with a fifth embodiment of the present invention. At step 802, the method 800 is initiated. At step 804, a request is received by the mobile communication device 100 to initiate a call to an emergency services number. The request can be made by a user of the mobile communication device 100 when he/she is an emergency situation. The emergency situation can be an accident, a fire, a tornado, a hurricane, a terrorist attack or any other unwanted condition where the user requires help. At step 806, it is determined whether the mobile communication device 100 is out of network coverage area. For one embodiment, the mobile communication device 100 is converted into a low power mode device when it is established that the mobile communication device 100 is out of network coverage. In the low power mode, the mobile communication device 100 is transformed into a beacon transmitting device. All the other functionalities of the mobile communication device 100 are shut off and only the beacon transmission facility remains intact. At step 808, an emergency beacon is transmitted over a plurality of frequencies, when it is established that the mobile communication device 100 is out of network coverage area. Further, the emergency beacon can also be transmitted at a plurality of modulations. In one embodiment, the plurality of modulations can be different amplitude modulations.

The transmission of the emergency beacon over the plurality of frequencies and modulations can be aborted when the user manually disengages the transmission. The transmission is also aborted when the battery of the mobile communication device 100 is exhausted or when the network coverage is again restored. At step 810, the method 800 is terminated.

Various embodiments, as described above, provide a method and system for responding to an emergency situation from a mobile communication device. The present invention allows a user of the mobile communication device to initiate a call to an emergency services number over a plurality of air interfaces simultaneously. This helps the user when the call cannot be transmitted using a particular air interface. In this case, another air interface can be selected and the call can be transferred over this air interface. Also, the system has the capability to transmit an emergency beacon even when it is out of network coverage area. In this case, the mobile communication device is transformed to a low power mode. Only the emergency beacon transmission facility of the device is kept intact, and all the other functions are shut off. This can save battery power of the mobile communication device. Further, a preconfigured emergency message can also be send to a predetermined list of users. This transmission of the emergency message can be performed simultaneously with the initiation of the call. The transmission of the emergency message acts as a back-up to the call to the emergency services number. The user may convey his situation to his friends, parents, relatives etc. along with the rescue agencies.

It will be appreciated that embodiments of the invention described herein may be comprised one or more conventional processors and unique stored program instructions that control the one or more processors to implement, in conjunction with certain non-processor circuits, some, most, or all of the functions of the embodiments of the invention described herein. The non-processor circuits may include, but are not limited to, a radio receiver, a radio transmitter, signal drivers, clock circuits, power source circuits, and user input devices. As such, these functions may be interpreted as steps of a method for responding to an emergency situation from a mobile communication device. Alternatively, some or all functions could be implemented by a state machine that has no stored program instructions, or in one or more application specific integrated circuits (ASICs), in which each function or some combinations of certain of the functions are implemented as custom logic. Of course, a combination of these approaches could be used. Thus, methods and means for these functions have been described herein. In those situations for which functions of the embodiments of the invention can be implemented using a processor and stored program instructions, it will be appreciated that one means for implementing such functions is the media that stores the stored program instructions, be it magnetic storage or a signal conveying a file. Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, the invention and its benefits and advantages have been described with reference to specific embodiments. However, one with ordinary skill in the art would appreciate that various modifications and changes can be made, without departing from the scope of the present invention, as set forth in the claims below. Accordingly, the specification and the figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. In a mobile communication device having first and second transceivers, a method for initiating more than one concurrent communication from the mobile communication device, the method comprising:
    initiating a call to an emergency services number using the first transceiver of the mobile communication device, the first transceiver using a first wireless air interface;
    detecting the initiating of the call to the emergency services number; and
    in response to detecting the call to the emergency services number, a processor carried in the communication device initiating automatically a transmission to a predetermined list of at least one number other than an emergency services number, the list of at least one number stored on the mobile communication device, the transmission using the second transceiver of the mobile communication device, the second transceiver using a second wireless air interface, and wherein initiating the transmission using the second transceiver is performed concurrently with the call to the emergency services number using the first transceiver.

2. The method for responding to an emergency situation as recited in claim 1, wherein the first transceiver comprises a cellular transceiver, and where the step of initiating the call using the first transceiver includes controlling the call to be made using the cellular transceiver.

3. The method for responding to an emergency situation as recited in claim 1, wherein detecting the initiating of the call to an emergency services number includes identifying a partial sequence of an emergency services number being entered on a user input of the mobile communication device.

4. The method for responding to an emergency situation as recited in claim 1, wherein the transmission includes one or more of a text message, a voice message and a text telephone (TTY) message.

5. The method for responding to an emergency situation as recited in claim 1, wherein the first air interface and the second air interface is selected from a group comprising a Code Division Multiple Access (CDMA) air interface, a Push-to-Talk (PTT) air interface, a Global System for Mobile communication (GSM) air interface and a direct communication air interface.

6. The method for responding to an emergency situation as recited in claim 1 further comprising terminating the transmission when an acknowledgement message is received at the mobile communication device from the emergency services number.

7. The method for responding to an emergency situation as recited in claim 1 further comprising manually terminating the transmission.

8. The method for responding to an emergency situation as recited in claim 1, wherein the transmission includes transmitting a preconfigured emergency message.

9. The method for responding to an emergency situation as recited in claim 8, wherein the preconfigured emergency message is selected from the group comprising a voice message, a text message and an icon.

10. The method for responding to an emergency situation as recited in claim 8 further comprising pre-configuring the predetermined list of users by a user of the mobile communication device.

11. The method for responding to an emergency situation as recited in claim 8 further comprising disengaging the transmission of the preconfigured emergency message when an acknowledgement message is received by the mobile communication device from one or more users of the predetermined list of users.

12. The method for responding to an emergency situation as recited in claim 1 further comprising:
    determining whether the mobile communication device is within a network coverage area; and
    transmitting an emergency beacon over a plurality of frequencies when the mobile communication device is out of the network coverage area.

13. A mobile communication device, comprising:
    a first modem carried in the communication device; and
    a second modem carried in the communication device,
    wherein the first modem being operable to initiate a call to an emergency services number, the call to be made using a first wireless air interface, and the second modem being operable to initiate automatically a transmission to a predetermined list of at least one number other than an emergency services number, the list stored on the communication device, the transmission to be made using a second wireless air interface, the transmission initiated automatically in response to detecting the call to the emergency services number initiated from the mobile communication using the first modem, wherein initiating the transmission is performed concurrently with the call to the emergency services number using the first wireless air interface.

14. The mobile communication device as recited in claim 13 further comprising a memory storing a preconfigured emergency message, wherein the transmission includes transmitting the preconfigured emergency message.

15. The mobile communication device as recited in claim 14, wherein the preconfigured emergency message is selected from a group comprising a voice message, a text message and an icon.

16. The mobile communication device as recited in claim 13, wherein the first air interface and the second air interface is selected from a group comprising a Code Division Multiple Access (CDMA) air interface, a Push-to-Talk (PTT) air interface, a Global System for Mobile communication (GSM) air interface and a direct communication air interface.

17. The mobile communication device as recited in claim 13 further comprising a satellite positioning receiver configured to determine a location information of the mobile communication device.

18. The mobile communication device as recited in claim 13, wherein the first modem is coupled to a transceiver operable using the first wireless air interface.

19. The mobile communication device as recited in claim 13, wherein the second modem is coupled to a transceiver operable using the second wireless air interface.

* * * * *